(12) United States Patent
Gurin et al.

(10) Patent No.: US 7,011,048 B2
(45) Date of Patent: Mar. 14, 2006

(54) METHOD AND APPARATUS FOR LIQUID FUEL PREPARATION TO IMPROVE COMBUSTION

(75) Inventors: Victor Gurin, North Miami Beach, FL (US); Peter Novak, Fort Lauderdale, FL (US); Bary Wilson, Coconut Creek, FL (US); Miron Prakhin, Sunny Isles, FL (US)

(73) Assignee: Enerl, Inc., Fort Lauderdale, FL (US)

( * ) Notice: Subject to any disclaimer, the term of this patent is extended or adjusted under 35 U.S.C. 154(b) by 0 days.

(21) Appl. No.: 10/984,603

(22) Filed: Nov. 9, 2004

(65) Prior Publication Data
US 2006/0016403 A1   Jan. 26, 2006

Related U.S. Application Data

(60) Provisional application No. 60/590,239, filed on Jul. 22, 2004.

(51) Int. Cl.
F02M 21/04   (2006.01)

(52) U.S. Cl. .................. 123/1 A; 123/525; 123/527

(58) Field of Classification Search ............... 123/1 A, 123/2, 3, 27 GE, 522–527, 531, 575; 210/150–151; 55/413
See application file for complete search history.

(56) References Cited

U.S. PATENT DOCUMENTS

| | | | |
|---|---|---|---|
| 4,031,874 A | 6/1977 | Alwine | 261/113 |
| 4,191,153 A | 3/1980 | Strem et al. | 123/523 |
| 4,283,917 A | 8/1981 | Proffer | 62/7 |
| 4,376,423 A * | 3/1983 | Knapstein | 123/1 A |
| 4,519,356 A | 5/1985 | Sarich | 123/533 |
| 4,945,886 A | 8/1990 | McKay et al. | 123/533 |
| 5,150,836 A | 9/1992 | McKay et al. | 239/5 |
| 5,536,454 A | 7/1996 | Fujii et al. | 261/97 |
| 5,836,290 A * | 11/1998 | Gilbert | 123/522 |
| 6,273,072 B1 * | 8/2001 | Knapstein et al. | 123/527 |
| 6,314,919 B1 * | 11/2001 | Pugachev | 123/3 |
| 6,612,295 B1 | 9/2003 | Lerner | 123/593 |
| 6,711,893 B1 * | 3/2004 | Ueda et al. | 60/285 |
| 2004/0134194 A1 * | 7/2004 | Roby et al. | 60/750 |

FOREIGN PATENT DOCUMENTS

WO   2004/065779 A2   8/2004

* cited by examiner

*Primary Examiner*—Hai Huynh
(74) *Attorney, Agent, or Firm*—Laurence A. Grenberg; Werner H. Stemer; Ralph E. Locher

(57) ABSTRACT

An apparatus and method for dissolving gas or gases in liquid fuel to improve combustion of the liquid fuel when injected into a combustion chamber is provided. A gas-charger unit is provided to dissolve the gas into liquid fuel at a first pressure. The pressure of the fuel/gas solution is raised to a second pressure before injection of the atomized fuel into a combustion chamber. In one embodiment, a high pressure gas or gasses is/are introduced into the gas charger at a crosscurrent to the liquid fuel. In another embodiment, a gas charger for dissolving gas into a liquid fuel is provided including a plurality of highly porous baffles to increase the contact surfaces between the gas and the liquid.

13 Claims, 3 Drawing Sheets

METHOD AND APPARATUS FOR LIQUID FUEL PREPARATION TO IMPROVE COMBUSTION

CROSS REFERENCE TO RELATED APPLICATION

The present application is related to and claims the benefit of U.S. Provisional Application Ser. No. 60/590,239 filed on Jul. 22, 2004 and entitled Method and Apparatus for Liquid Fuel Preparation to Improve Combustion.

BACKGROUND OF THE INVENTION

Field of the Invention

The present invention relates to liquid fuel combustion and, more particularly, to the dissolution of gasses in liquid fuels under high pressure prior to injection into a combustion chamber.

Efficient burning of the fuel-air mixture is critical to the performance of all internal combustion engines. To attain the most desirable combustion characteristics in reciprocating engines, the fuel charge should be of uniformly small droplet size and properly distributed in the combustion chamber prior to ignition and burning.

Conventional fuel atomizing devices (fuel injectors or carburetors) typically provide a fuel spray charge having a wide range of droplet sizes. Small droplets (less than 20 microns) improve the efficiency of fuel combustion since they are vaporized much faster. The vaporization process is one of progressively and significantly increasing the surface area of the injected fuel, thus bringing more fuel molecules into direct contact with oxygen. Current fuel injector devices do not break up the fuel into small droplets, and particularly not into droplets in the size range of 10 micrometers or less.

Compared to carburetion or injection into the manifold, greatly improved distribution of the fuel charge in the combustion chamber can be achieved by direct injection of fuel into the combustion chamber of the cylinder. Direct injection has long been used in diesel (compression combustion) engines, and has recently re-emerged in gasoline (ignition combustion) engines as a means of increasing efficiency.

For example, the Australian ORBITAL ENGINE COMPANY (Australia) PTY LTD of Balcutta, Western Australia, has introduced a direct injection system for mass-produced gasoline engine automobiles, and such direct injection systems are also currently used in some 2-stroke outboard marine engines. That prior art fuel preparation and injection system apparently is difficult to control because of the considerable difficulties associated with controlling air volumes (compressible fluid) and high pressure injection in the mixture.

U.S. Pat. No. 4,191,153 to Strem et al. discloses a system and method of feeding gasoline fuel into a gasoline burning internal combustion engine. In Strem et al., gasoline fuel in a liquid state is first supplied to a vaporization chamber where it is vaporized, preferably without the use of externally applied heat. The gasoline in this state is then directed to the engine.

However, there remain disadvantages to the above systems. There is a need to implement a direct injection system into multi-cylinder 4-stroke automobile engines. Further, there is a need for a system that provides uniformity of the injected liquid/gas mixture droplets to prevent the air injection characteristics from varying from cylinder to cylinder.

SUMMARY OF THE INVENTION

It is accordingly an object of the invention to provide a method and apparatus which overcomes the above-mentioned disadvantages of the heretofore-known devices and methods of this general type and which provides for a further improvement in fuel/gas dissolution and fuel injection into a combustion chamber.

With the foregoing and other objects in view there is provided, in accordance with the invention, a gas-charger unit for dissolving the liquid fuel at a first high pressure. The pressure of the fuel/gas mixture is raised to a second higher pressure before injection of the fuel into a combustion chamber.

In one particular embodiment, a high pressure gas or gasses is/are introduced into the gas charger at a crosscurrent to the liquid fuel.

In another particular embodiment, a gas charger for dissolving gas into a liquid fuel is provided including a plurality of highly porous baffles to increase the contact surfaces between the gas and the liquid.

In other words, the objects of the invention are achieved with a gas charger for providing a liquid/gas fuel solution to a combustion chamber, comprising:
  a housing having a liquid inlet port, a gas inlet port, and a liquid/gas outlet port, said housing defining a liquid flow path therethrough between said liquid inlet port and said liquid/gas outlet port;
  at least one porous baffle disposed in the liquid flow path;
  a fuel pump for providing liquid fuel at a first pressure to said liquid inlet port;
  a gas source for providing at least one gas at a second pressure to said gas inlet port, wherein the gas is dissolved in the liquid fuel for form a liquid/gas fuel solution; and
  a charge pump connected between said liquid/gas outlet port and the combustion chamber, for raising a pressure of the liquid/gas fuel solution to a third pressure higher than said first and second pressures prior to injection into the combustion chamber.

In accordance with an added feature of the invention, the assembly includes a cooling system to cool the liquid/gas fuel solution. Preferably, the liquid/gas fuel solution is cooled to 20° C.±15° C.

In accordance with an additional feature of the invention, the first pressure lies preferably between 7 and 22 MPa and is elevated over the second pressure by approximately 1 to 5%. Advantageously, said second pressure lies between 7 and 22 MPa and said third pressure is preferably between 11 and 33 MPa.

In accordance with a further feature of the invention, the high porosity baffle element are constructed from at least one rolled, corrugated screen. In a preferred implementation, the high porosity baffle element includes a plurality of high porosity baffle elements including,
  at least one rolled element comprising at least one corrugated screen rolled with at least one flat screen, and
  at least one flat screen located in close proximity to said at least one rolled element.

With the above and other objects in view there is also provided, in accordance with the invention, a method for providing fuel to a combustion chamber, comprising the steps of:
  providing a gas charger unit comprising,
    a housing defining a liquid flow path therethrough, the liquid flow path being defined between a liquid inlet port and a liquid outlet port, the housing additionally including a gas inlet port; and at least one high porosity baffle disposed in the liquid flow path, feeding liquid fuel at a first pressure to the liquid inlet port, feeding at least one gas at a second pressure to the gas inlet port, and dissolving the gas in the liquid fuel to form a liquid/gas fuel solution, pumping the liquid/gas fuel solution from the liquid outlet port to a third pressure level higher than the first and second pressures prior to injection into the combustion chamber.

The system as described in the present patent application has a number of advantages over present fuel injection systems, including homogeneity of the gas distribution in the liquid fuel, and equal gas/fuel characteristics for injection in each cylinder of a combustion engine.

Other features which are considered as characteristic for the invention are set forth in the appended claims.

Although the invention is illustrated and described herein as embodied in a fuel preparation assembly and method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

DESCRIPTION OF THE PREFERRED EMBODIMENTS

The present invention relates to the use of a "gas-charger", "gas-charger unit" or "gas charging system" that is employed to dissolve a gas or gases into liquid fuel to improve fuel efficiency. The solubility of a gas in a liquid is governed by certain principles.

According to Henry's law, an increase in the partial pressure of a gas above a gaseous solution results in a linear increase in the concentration of the gas in the solution, at a given temperature. Specifically, the product concentration (C) of gas in a solution and the partial pressure (P) of a gas above a solution are related by a constant (k) according to the following equation:

$$C=kP$$

Additionally, in a liquid/gas solution, the solubility of gasses in a liquid generally decreases with increasing temperature. This is because gaseous solutes have an exothermic heat of solution. Therefore, since increasing the temperature will always favor the endothermic process, the dissolution (solution breakdown) process will be favored and solubility will decrease.

The relative polarity of the solvent and solute materials is also an important factor in gas liquid solutions. Relatively non-polar gasses such as light hydrocarbons will dissolve better in non-polar hydrocarbon liquids than will polar gasses such as ammonia for example.

In one particular embodiment of the present invention, gas is dissolved into the fuel at a given temperature and pressure and then the pressure is greatly increased by a secondary pump prior to injection of the fuel. While the design of engine systems is such that the fuel increases somewhat in temperature as it approaches the injection port, the increase in pressure more than offsets the temperature effect, insuring that the gas stays in solution until the pressure is released upon injection, wherein, the pressure decrease upon injection is substantial. The present embodiment uses pressures at injection from 7 to 22 MPa (Mega-Pascals)+150%, while combustion chamber pressures are typically from 1 to 2.5 MPa or less.

Figure 1:
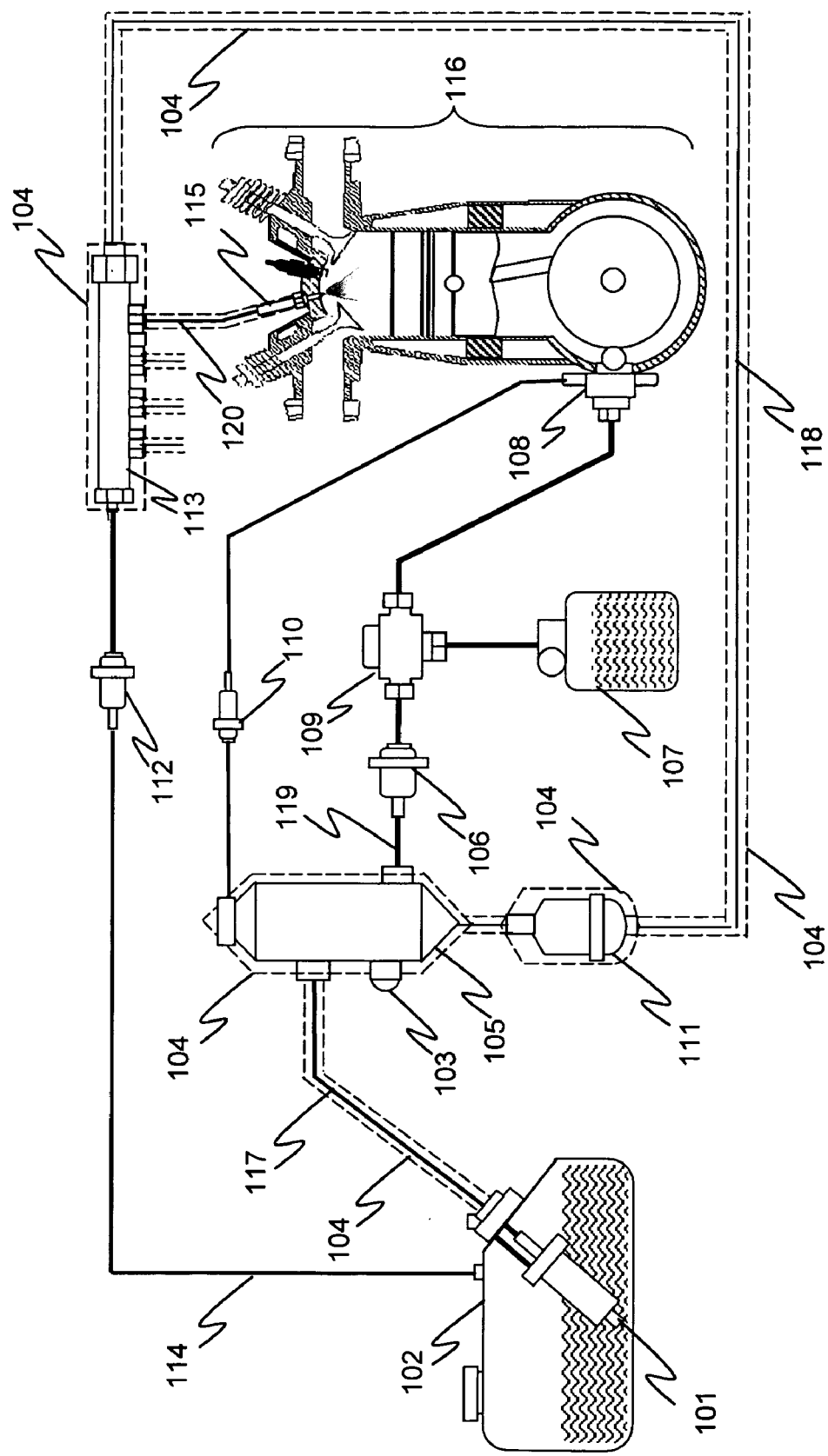
FIG. 1 is a diagram showing one preferred embodiment of the present invention as deployed in connection with an ignition combustion reciprocating engine.

Referring now to the figures of the drawing in detail and first, particularly, to FIG. 1 thereof, there is provided an efficient liquid fuel combustion system for use with an internal combustion engine 116 in accordance with one embodiment of the present invention. As shown, liquid fuel from a fuel tank 102 is conveyed, under elevated pressure $P_{fuel}$, to the fuel gas charger unit 105. The fuel pressure $P_{fuel}$ is generated by means of a fuel pump 101 and the fuel is delivered by means of a fuel line 117. A level sensor 103 is used to control the amount of liquid fuel provided by the fuel pump 101 to the gas charger unit 105.

The fuel pressures at this first pressure stage of the system range from about 7 to 22 (+3%) MPa, for example. In heavier and more highly charged engines the fuel pressure $P_{fuel}$ will lie in the upper part of the range. In typical sedan motor vehicles, the preferred pressure is approximately $P_{fuel}=10$ MPa.

Gas or gases, such as air, are supplied from one or more high-pressure sources. In the embodiment depicted in FIG. 1, two alternate sources are shown. One source is high-pressure air supplied by a mechanical compressor 108, which is driven by the engine 116. The second source is a high-pressure tank 107. The pressure of the gas, or gases, supplied into the charger is controlled by the pressure regulator 106 and the pressure relief valve 110. The gas or gasses are supplied at a pressure $P_{gas}$ of between approximately 7 MPa and 22 MPa. A gas pressure relief valve 110 helps control gas pressure to the charger unit 105.

The injection pressures of the gas and the fuel into the gas charger 105 are approximately equal, with the fuel pressure being slightly higher than the gas pressure. In order to assure proper injection and solution, the fuel pressure $P_{fuel}$ is slightly higher than the gas pressure $P_{gas}$. In a preferred embodiment of the invention, the relationship is $P_{fuel}=P_{gas}+3\%$.

In the embodiment depicted in FIG. 1 a two-way valve 109 can be used to select between compressed air from the compressor 108 or the gas or gasses in a storage tank 107. However, this is not meant to be limiting. It is understood that the two-way valve 109 can be omitted and only one source of gas (i.e. either compressor 108 or tank 107) could be provided. The dissolved gas or gases provided to the system may include air, oxygen, light hydrocarbons such as butane or propane, other hydrocarbon gasses, or hydrogen.

A second stage fuel pump 111 in fluid communication with the fuel outlet of the gas charger 105 boosts the pressure of the fuel/gas solution from the range of between 7 and 22 MPa by approximately 50% to between 11 and 33 MPa. That is, the second stage pressure pump 111 raises the outlet pressure Pout of the gas charger which is made up of the partial pressures $P_{fuel}$ and $P_{gas}$ to a rail pressure according to the relationship $P_{rail}=P_{out}+50\%$. It should be understood that the percentage indicators (50% and 3%) provided herein are approximate only and that these pressure boosts may be varied considerably. The pressurized fuel/gas solution, in liquid phase but "charged" with gas and at the high rail pressure $P_{rail}$ then flows via fuel line 118 to an injection rail 113, and then to one or more injectors 115. A pressure regulator 112, that is used to maintain proper fuel pressure in the rail 113, and also serves to return unused fuel via line 114 to the fuel tank 102. In one particular embodiment, check valves are used as the pressure regulators 106 and 112, to prevent back flow into the gas supply line 119 and fuel line 114, respectively. It should be understood that the common rail system described herein is but one embodiment of the invention, which is equally applicable for direct injection, partial rail, prechamber injection, and the like.

The use of a gas charger in accordance with the present invention with a direct injection system serves two primary and advantageous functions. First, in a direct injection system there is an effective dispersion of liquid fuel into the cylinder. Second, the present system provides for an optimal distribution of the injected portion of gasified fuel into the cylinder.

In constructing the above-described systems, standard parts may be used for components such as for the first-stage pump 101, the storage tank 102, level controller 103, overpressure protection 106, 110 and 112 and the second-stage high pressure pump 111. Additionally, the gas-saturated liquid fuel generated by the above described gas charger systems is intended for injection into a combustion chamber by existing or very slightly modified fuel injection systems.

Referring back to FIG. 1, the charger unit 105 and/or its associated fuel lines 117, 118 may be cooled or thermally controlled by a coolant jacket 104 (shown in dotted line). In such a system, cooling the high-pressure fuel pump 111 and associated fluid connecting lines 118 to a temperature of 20±15° C. can help prevent the dissolved gas from exiting the fuel/gas solution before entering the fuel injector(s) 115. The cooling system, in a preferred embodiment is an active system that is driven by the air conditioning system that is present in the vehicle anyway. In the preferred embodiment, cooled liquid is pumped inside a jacket 104 surrounding the fuel lines 117, 118, charger unit 105, second stage fuel pump 111, injection rail 113 and fuel lines 120. Coolant jacket 104 of charger unit 105, second stage fuel pump 111 and injection rail 113 is a liquid grid jacket surrounding these units. The fuel lines 117, 118 and 120 therefore, a double-jacket pipes with the coaxial core pipe carrying the fuel and the coaxial outer jacket pipe carrying the coolant. In an alternative embodiment, it may be possible to cool at least a portion of the fuel supply system with heat exchange or air cooling.

Figure 2:
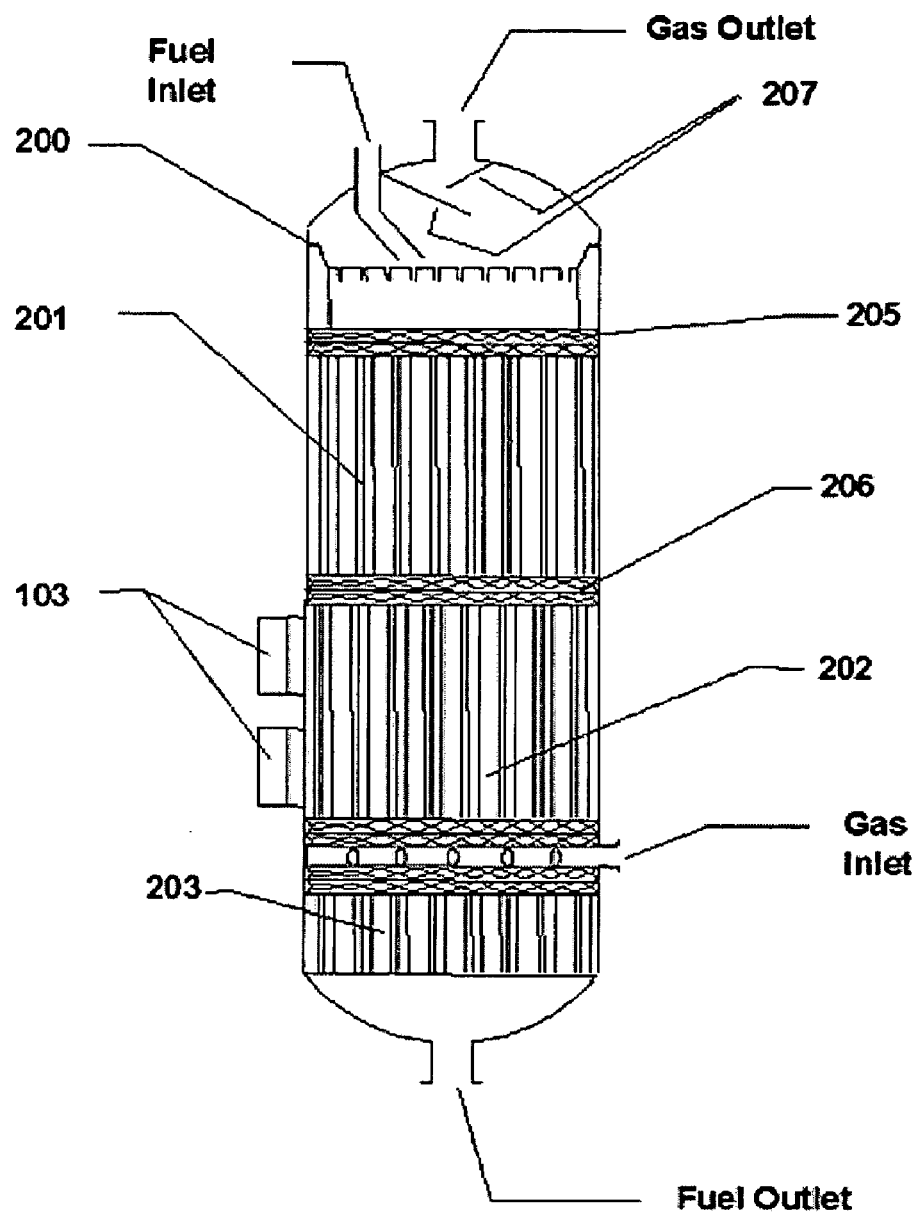
FIG. 2 is a diagram of a gas charger unit in accordance with one preferred embodiment of the present invention.

Because the amount of gas or gases diluted in liquid fuel is the function of gas pressure, time of contact between liquid and gas and the contact surface characteristics, the gas charger of the present invention can be constructed to address each of these factors. The gas charger described herein comprises a reservoir containing liquid fuel into which a gas or mixture of gasses has been dissolved. In one embodiment, specially constructed porous materials deployed as baffle elements in the reservoir generate a streamline or laminar flow of the liquid fuel against a counter flow of the solute gas under the increased pressure $P_{gas}$ to dissolve the gas(es) into the liquid fuel. FIG. 2 depicts one such embodiment of a gas charger 200, that may be used as the gas charger unit 105 of FIG. 1. The gas charger 200 is used to prepare liquid fuel for injection and dispersion into a combustion chamber, such as is used in the engine 116 of FIG. 1. In the gas charger 200, liquid fuel is saturated with gas(es) under pressure to store energy. This energy is released during fuel injection in the combustion chamber for effective dispersion of the atomized fuel. As a result, the consistency of the prepared fuel/gas mixture is identical for injection in each cylinder for the multi-cylinder engine.

Inside the gas-charger 200, liquid fuel flows in streamline mode over the porous baffle elements 201 against a countercurrent of the solute gas(es) introduced through gas inlet 208. As described above, it is preferred that the gas(es) be introduced into the gas charger at a pressure $P_{gas}$ of between 7–22 MPa.

The gas flow bed of the gas charger 200 is designed to provide for maximum surface contact. Liquid fuel flows downward from the upper fuel inlet 210 towards the lower fuel outlet 211 over baffle elements 201, 202 and 203 and through the flat screens 205 and 206. To prevent liquid fuel from exiting the gas charger 200 through the gas outlet 209, baffle plates 207 are provided. The gas outlet 209 is connected into the low-pressure gas system, i.e., into the recirculating system communicating with the gaseous volume in the gas tank 102, via a pressure relief valve. The baffle plates 207 or baffles 207 prevent liquid fuel from escaping to and flowing through the pressure relief valve.

Gas(es) is/are pumped into the gas-charger 200 in the lower zone of the gas charger 200 at a countercurrent to the liquid flow. As a result, gas-saturated liquid fuel flows from the upper zone through the baffle elements 201, 202, 203 and flat screens 205 and 206 and to the fuel outlet 211. The quantity of liquid fuel in the gas charger 200 (typically approx. 4 mm$^3$/s) is controlled by the fuel supply device (101 of FIG. 1) communicating with the level sensor 103.

The screen and baffle element system of one particular embodiment of the present invention will now be described in connection with FIG. 3. The fluid path 300 of a gas charger unit is shown including a plurality of multi-channeled rolled filler elements 301 and flat screens 304. The flat screens 304 essentially act as flow redirectors, i.e., stratified fluid flow from a flow channel in the upstream honeycomb is redistributed and broken up into partial flows into several flow channels in the downstream honeycomb. In one particular preferred embodiment, the multi-channeled rolled filler elements 301 of the present embodiment are used as the baffle elements 201, 202 and 203 of FIG. 2.

The multi-channeled rolled filler elements 301 of the present embodiment are constructed from rolled or corrugated screens having honeycomb type openings of 0.5–3 mm$^2$ and preferably approx. 1—1.5 mm$^2$. Openings of this size provide effective mixing of the liquid fuel flowing downward with the gas flowing upward. If desired, the filler elements 301 can have other geometrical configurations, including, cylindrical, spherical, toroidal, or prismatic. Additionally, the working surfaces of the filler elements may be coated with a low-friction material, such as the tetrafluoro-polymer TEFLON® by DUPONT. Further, the high porosity baffle elements may be constructed from materials with arbitrary surfaces, such as, wire mesh, Teflon filings, ceramic pellets or fibrous materials to provide large surface interface between gas and liquid fuel flows. The baffle elements are used to generate a streamline flow of fuel, and maximize the surface area of the fuel/gas interface. It is also possible to have stamped deflectors on the corrugations of the screen 303 and/or the flat sheet 302, so as to facilitate crossflow between adjacent flow channels.

Figure 3:
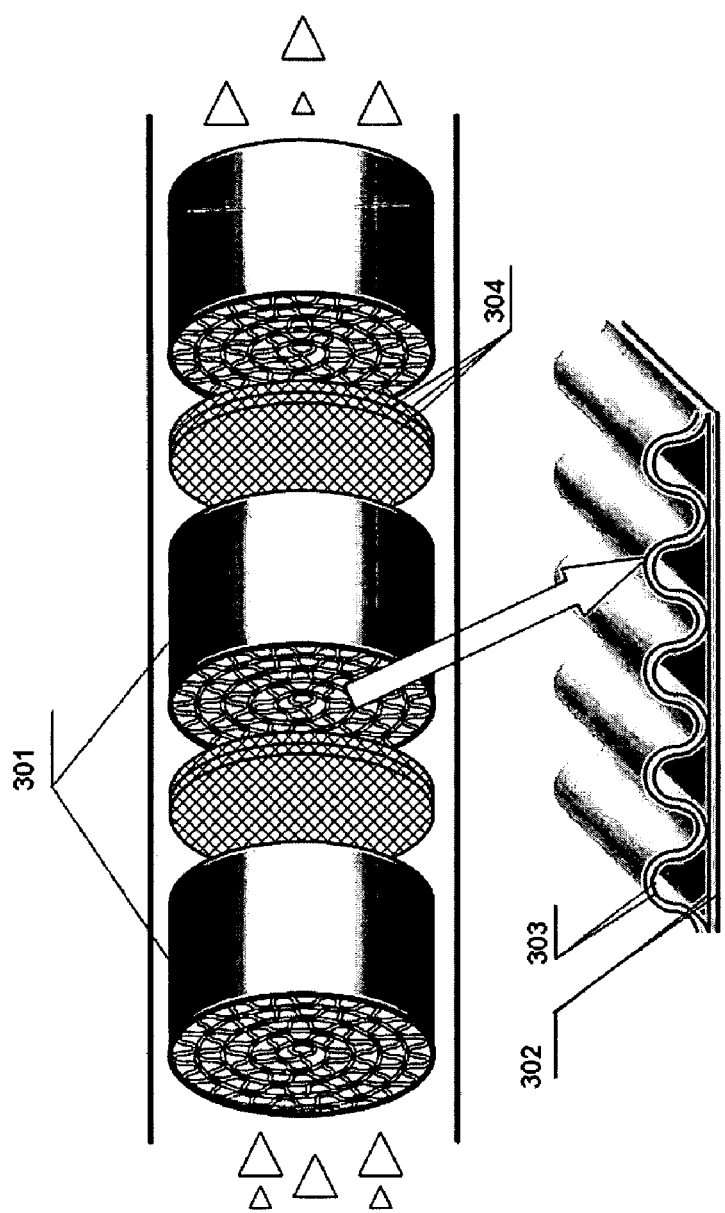
FIG. 3 is an exploded perspective view of a portion of a gas charger unit in accordance with one particular embodiment of the present invention with a specific detail shown.

As shown in the inset to FIG. 3, screen portion 305 may comprise two flat screens 302 and two corrugated screens 303, the two corrugated screens 303 being superimposed over the two flat screens 302, which are then rolled together to form the element 301. The two screen layers are employed to achieve slit like channels for liquid passage. The area of one cross section ripple (ridge and groove) in corrugated screen 303 defining the flow channels is preferably between 0.5 and 1.5 mm². It is preferred that all screens, when assembled, have openings between 1 to 3 mm² and preferably approximately 1.5 mm². The streamline liquid fuel flow breaks up on these openings. Streamline-interrupted liquid flow increases contact surface between gas and liquid. A charger design having such rolled multi-channels baffle elements will provide effective contact between gas and liquid.

Referring now once more to FIGS. 1 and 2, in operation, liquid fuel is pumped into the charger unit 105, 200 from the fuel tank 102, at a pressure $P_{fuel}$ greater than atmospheric pressure (up to 22 MPa). External gas(es) is/are introduced to the gas charger unit 105, also at a pressure $P_{gas}$ greater than atmospheric pressure, preferably from about 7 to 22 MPa. As provided at the gas inlet 208, the high pressure gas(es) is/are introduced at a crosscurrent to the liquid flow. At these pressures, the liquid fuel is saturated, or nearly saturated, with the external gas. Such gas or gasses can include compressed air, oxygen, light hydrocarbons such as propane or butane or other hydrocarbon gasses, or hydrogen. According to the present invention gas, or gasses, are dissolved into the liquid fuel prior to injection into the combustion chamber. Gasses thus introduced and injected under high pressure into the combustion chamber expand rapidly as the external pressure decreases in the combustion chamber. The stored energy of the compressed gas helps to rapidly and uniformly atomize the liquid fuel.

The gas-saturated liquid fuel is then pumped again using the second stage pump 111 to an increased pressure e.g. 1.1 to 500 times greater than pressure in the combustion chamber during fuel/air mixture final injection. The saturated fuel gas solution is then pumped into the injector system, preferably a common rail injector system, at the pressure $P_{rail}$ of between 11 and 33 MPa ($P_{out}$+50%). The mixture is subsequently injected directly into the cylinder combustion chamber where it is rapidly dispersed with the help of the expanding gas formerly dissolved in the fuel gas mixture.

Upon injection, the dissolved gas rapidly expands as the pressure is reduced. Due to the rapid decrease in pressure between the injected gas/fuel solution and that of the combustion chamber, gas exiting from the gas/fuel solution during injection will create an aerosol. This is analogous to the "fizz" effect observed when the pressure is suddenly released on the dissolved carbon dioxide in a vigorously shaken soft drink container by opening the lid or it may be compared to the energy release when a champagne bottle is opened. The energy of this expansion helps to rapidly and uniformly break up the injected fuel stream into small droplets (in the 10 micron range) of relatively uniform size. The expansion of the dissolved gasses also helps generate a uniform fuel charge throughout the volume of the combustion chamber. Accelerated expansion of the fuel charge and its atomization into uniformly small droplets greatly increase the efficiency of the combustion process in the cylinder. This results in increased power, smoother delivery of power and reduced hydrocarbon emissions, especially from diesel engines.

The system as described in the present patent application has a number of advantages over present fuel injection systems. Among these is the homogeneity of the gas distribution in the liquid fuel, which thus providing equal identical gas/fuel characteristics for injection in each cylinder of combustion engine. By achieving much finer dispersion of the liquid fuel, the present invention provides more complete combustion, thus increasing engine efficiency and decreasing exhaust pollution. The gas-charger stores energy from gases or gas, for example, air, saturated in liquid fuel for further release into combustion chamber and also converts liquid fuel into uniform fuel/gas solution. In addition to the traditional means for primary fuel atomization, break-up of the liquid fuel core into liquid fuel ligaments and secondary atomization or break-up of the liquid droplets into smaller droplets in the combustion chamber, as described herein, will greatly improve dispersion process.

While various embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

PARTS LIST 101 fuel pump
102 fuel tank
103 level sensor
104 coolant jacket
105 gas charger unit
106 pressure regulator
107 high-pressure tank
108 mechanical compressor
109 two-way valve
110 pressure relief valve
111 second stage fuel pump
112 pressure relief valve
113 injection rail
114 excess fuel return line
115 injector
116 internal combustion engine
117 fuel supply line
118 fuel supply line
119 gas supply line
120 fuel supply lines
200 gas charger
201 baffle element
202 baffle element
203 baffle element
205 screen
206 screen
207 deflecting plates
208 gas inlet
209 gas outlet
210 fuel inlet
211 fuel outlet
300 gas charger unit
301 multi-channeled rolled filler element
302 flat screen
303 corrugated screens
304 flat screens
305 screen portion

What is claimed is:

1. A gas charger for providing a liquid/gas fuel solution to a combustion chamber, comprising:
    a housing having a liquid inlet port, a gas inlet port, and a liquid/gas outlet port, a plate honeycomb packing element disposed in said housing and formed with highly developed surfaces for creating a laminar streamline liquid flow, said housing defining a liquid flow path therethrough between said liquid inlet port and said liquid/gas outlet port;
    a gas source for providing at least one gas at a first pressure $P_1$ to said gas inlet port, wherein the gas is dissolved in the liquid fuel for forming a liquid/gas fuel solution;
    a gas supply system for supplying and maintaining the gas first pressure $P_1$ in said housing;
    a high-pressure fuel pump for supplying liquid fuel at a second pressure $P_2$ to said liquid inlet port;
    a high-pressure charge pump connected at said liquid/gas outlet port or inside said housing, for raising a pressure of the liquid/gas fuel solution to a third pressure $P_3$ higher than said first pressure.

2. The gas charger according to claim 1, wherein said first pressure $P_1$ lies preferably between 7 and 22 MPa and the second pressure $P_2$ is elevated over the first pressure $P_1$ by approximately 1 to 5%.

3. The gas charger according to claim 2, wherein said second pressure is preferably between 7 and 22 MPa and said third pressure is between 11 and 33 MPa.

4. The gas charger according to claim 1, wherein said third pressure is between 11 and 33 MPa.

5. The gas charger according to claim 1, wherein said plate honeycomb packing element is constructed from at least one rolled, corrugated screen formed with a plurality of holes having a nominal diameter of 0.5 mm connecting two sides of said rolled corrugated screen.

6. The gas charger according to claim 5, wherein said plate honeycomb packing element includes a plurality of plate honeycomb packing elements including,
    at least one rolled packing element comprising at least one corrugated screen rolled with at least one flat screen, and
    at least one flat screen located in close proximity to said at least one rolled element.

7. A method for providing fuel to a combustion chamber, comprising the steps of:
    (a) providing a gas charger unit comprising,
        a housing subject to high pressure and defining a liquid flow path therethrough, the liquid flow path being defined between a liquid inlet port and a liquid outlet port, the housing additionally including a gas inlet port; and
    (b) feeding liquid fuel at a relatively high second pressure $P_2$ to the liquid inlet port,
    (c) feeding at least one gas at a relatively high pressure $P_1$ to the gas inlet port, where $P_1$ is in a range 0.95 to 0.99 $P_2$ and $P_2$ lies in a range 7 to 22 MPa, and dissolving the gas in the liquid fuel to form a liquid/gas fuel solution,
    (d) pumping the liquid/gas fuel solution from the liquid outlet port to a third pressure $P_3$ higher than the first pressure $P_1$ prior to injection into the combustion chamber, to change the liquid/gas fuel solution to a substantially non-saturated solution.

8. The method according to claim 7, wherein the first pressure is between 7 and 22 MPa.

9. The method according to claim 7, wherein the third pressure is between 11 and 33 MPa.

10. The method according to claim 7, wherein the third pressure is between 11 and 33 MPa.

11. The method according to claim 7, which further comprises guiding the fuel over a plate honeycomb packing element constructed from at least one rolled, corrugated screen inside the housing.

12. The method according to claim 11, wherein the plate honeycomb packing element includes a plurality of plate honeycomb packing elements including,
    at least one rolled element comprising at least one corrugated screen rolled with at least one flat screen, and
    at least one flat screen located in close proximity to said at least one rolled element.

13. In an internal combustion fuel system including a fuel injection system for injection into a combustion chamber of an engine, a gas charger comprising, comprising:
    a reservoir including a liquid flow path therethrough, the liquid flow path being defined between a liquid inlet port and a liquid outlet port, said housing further including a gas inlet port;
    a plurality of plate honeycomb packing elements disposed in said liquid flow path, at least a first of said plurality comprising at least one corrugated screen rolled with at least one flat screen, and at least a second of said plurality comprising a flat screen disposed in close proximity to said first;
    a first high pressure pump for providing liquid fuel at a second pressure to said liquid inlet port,
    a high pressure gas source for providing at least one gas at a first pressure to said gas inlet port unit,
    wherein the first pressure and the second pressure are sufficient to substantially dissolve the gas in the liquid fuel to form a liquid/gas fuel solution, and
    a second high pressure pump connected at said liquid outlet port or in a lower section of said housing for raising the pressure of the liquid/gas fuel solution to a third pressure higher than said second pressure prior to injection into the combustion chamber.

* * * * *